No. 612,019. Patented Oct. 11, 1898.
H. R. COLLINS.
VEHICLE WHEEL.
(Application filed Dec. 22, 1897.)
(No Model.) 2 Sheets—Sheet 2.
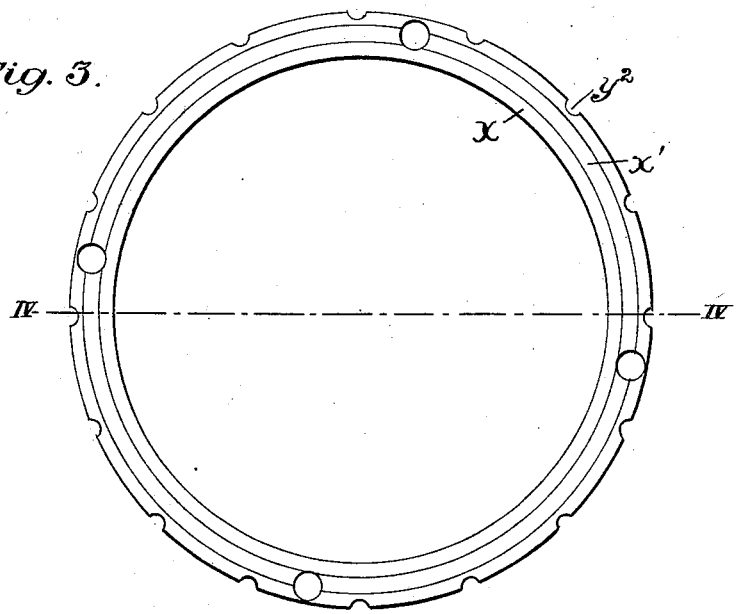
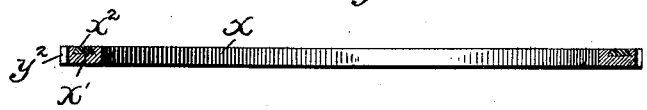
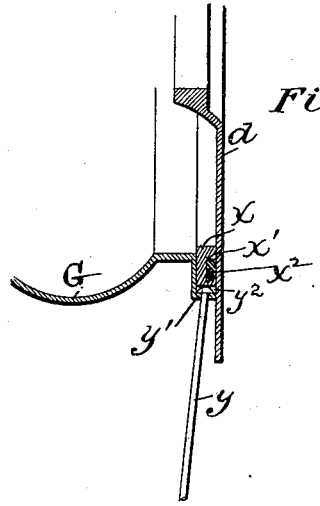
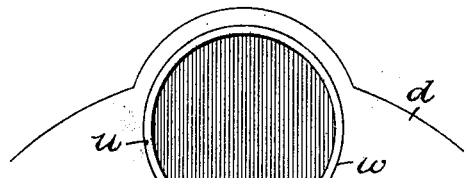
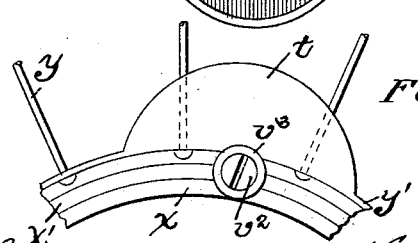
Witnesses. Inventor.
Edw. C. Duvall Jr. Harry R. Collins
Chas. E. Riordan By Julian C. Dowell
His Attorney.

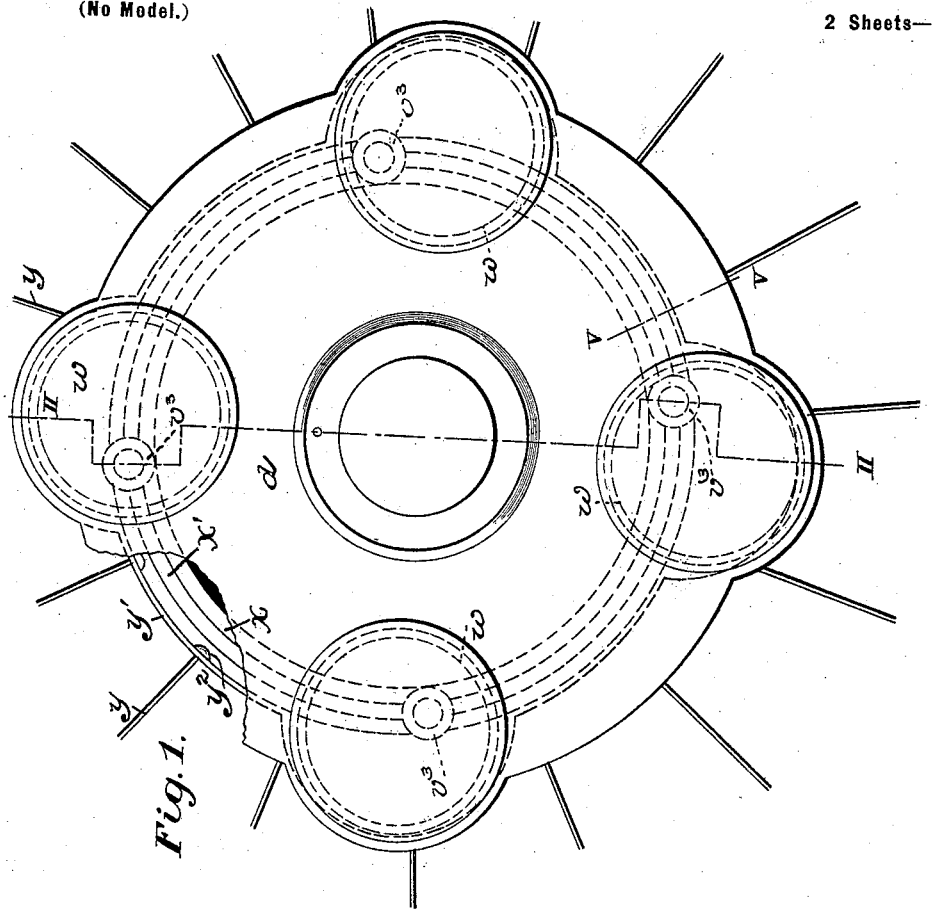
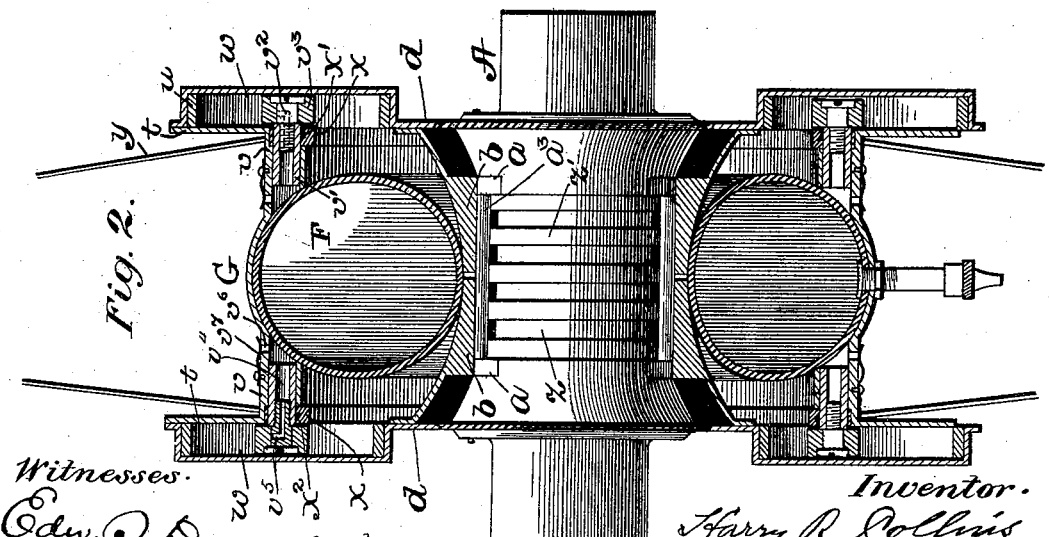

UNITED STATES PATENT OFFICE.

HARRY RAYMOND COLLINS, OF SOUTH BETHLEHEM, PENNSYLVANIA, ASSIGNOR TO THE COLLINS PNEUMATIC HUB AND WHEEL WORKS, OF PENNSYLVANIA.

VEHICLE-WHEEL.

SPECIFICATION forming part of Letters Patent No. 612,019, dated October 11, 1898.

Application filed December 22, 1897. Serial No. 663,073. (No model.)

*To all whom it may concern:*

Be it known that I, HARRY RAYMOND COLLINS, a citizen of the United States, residing at South Bethlehem, in the county of Northampton and State of Pennsylvania, have invented certain new and useful Improvements in Vehicle-Wheels; and I do hereby declare the following to be a full, clear, and exact description of the invention, such as will enable others skilled in the art to which it appertains to make and use the same.

This invention relates to that class of vehicle-wheels in which a cushion is employed at the hub, so that instead of relying upon pneumatic tires the cushioning effect is had at a point sufficiently remote from the surface traversed to entirely obviate the annoyance and difficulties resulting from the puncturing of pneumatic tires. This general idea has been embodied in various constructions shown in prior patents granted to me, and special reference is here made to Patents Nos. 594,603, 594,604, and 594,605, granted November 30, 1897, which show various arrangements of parts found in practice to more or less satisfactorily fulfil the requirements. I have, however, endeavored to still further improve the construction of a wheel of this type in the direction of reducing weight as much as possible and also providing for complete lubrication of all parts which have relative movement in contact with each other. The present invention also involves the employment of a different form of driving connection between the hub and the spoke-ring than any shown in said patents above referred to and also differing from the type of driving connection shown in my pending application, filed November 5, 1897, Serial No. 657,496. In order to effect a thoroughly practical result where power is applied directly to a wheel having a cushioned hub, it is evident that connections are necessary between the spoke-section of the wheel or spoke-ring and the hub which will at all times afford means for positively transmitting power between these parts while at the same time relative radial movement of the latter must be unobstructed. In my former patents above referred to and also in the above-mentioned pending application I have shown means for accomplishing this end; but in the present case I have illustrated a different arrangement which is calculated to accomplish the result equally as well if not better than those I have heretofore devised. I am aware that the broad idea of the form of connection here shown is not entirely new with me; but I believe I am the first to so embody this idea as to insure a practical result.

With the above-stated objects in view the invention consists in a number of novel features of construction and combinations of parts which are fully described hereinafter and the essential elements of which are recited in the appended claims.

The drawings which accompany and form part of this specification illustrate a preferred form of embodiment of the invention, and of said drawings—

Figure 1 represents the central portion of a wheel in side elevation with one of the hub flanges or disks partly broken away. Fig. 2 represents the same parts in cross-section on the line II II of Fig. 1. Fig. 3 represents in side elevation one of a pair of bearing-rings or washers which are employed between the hub flanges or disks and the spoke-ring. Fig. 4 represents this washer in cross-section. Fig. 5 is a fragmentary sectional view taken on line V V of Fig. 1. Fig. 6 is a fragmentary elevation of the inner side of one of the hub flanges or disks. Fig. 7 is a fragmentary elevation of one side of the spoke-ring.

The hub or sleeve, which is journaled upon an axle supported by the frame of the machine or vehicle in the ordinary or any suitable manner, is designated by the letter A, and it has fastened to it in any suitable manner a pair of disks or circular plates $d$, which constitute what have been hereinbefore referred to as "hub-flanges," being in effect parts of the hub. These disks are preferably connected with the hub in the manner shown in my former patent, No. 594,605, above referred to, and they are formed to interlock with segmental projections or ribs $a$ on the hub, and the portions of said disks occupying the space between the ends of the said segmental projections, together with the projections themselves, confine a set of antifriction-rollers $a^3$ in the same manner as shown in my said former patent. In order to reduce the amount of metal as much as possible in the sleeve or hub without impairing its strength, I make a number of grooves or channels $z$ in said sleeve or hub, leaving enough bearing-surfaces $z'$ between said grooves or channels to properly sustain the said antifriction-rollers. A saddle composed of interlocked sections $b$ surrounds and bears upon these antifriction-rollers, the saddle-sections being held together by the disks or hub-flanges $d$. The spoke-ring is designated by the letter G, and between the same and the said saddle there is interposed a cushion in the form of a pneumatic tube F, the said spoke-ring fitting between the disks $d$ and being properly guided thereby in its necessary radial play. This spoke-ring is suitably flanged at each side, in substantially the same manner as shown in my former patents hereinbefore referred to, to accommodate wearing-rings or washers $x$, and in order to prevent undue friction between the spoke-ring and the disk $d$ each of these washers is formed in its outer face with a groove $x'$, preferably dovetailed in cross-section and adapted to be filled with graphite or other suitable lubricating material, (indicated at $x^2$.) Such material issuing from these grooves against the inner surfaces of the hub-flanges will permit the parts to slide one upon the other without friction, and thus the life of the wheel will be greatly prolonged. The spokes $y$ are entered through the flanges $y'$ of the spoke-ring, which cover the peripheries of the packing-rings or washers, and thus the latter are utilized as means for preventing the inward projection of the spokes should the latter become loosened. Of course the spokes are in the first instance fastened in the said flanges, their inner ends being upset over the flanges, but the spokes sometimes work loose and the advantage of the above-described arrangement in such event is apparent. The periphery of each packing-ring or washer is preferably formed with a series of notches $y^2$, as clearly shown in Fig. 3, to accommodate the upset ends of the spokes.

Passing next to the driving connections between the hub and the spoke-ring, each of the disks $d$ is formed with four equidistant circular recesses $w$, which are produced in the process of making the disk by pressing out portions of the same, and it may here be remarked that this also has the advantage of strengthening the disk. At each side the spoke-ring is formed or provided at four equidistant points with bosses $v$, each of which is formed with a screw-threaded bore to receive a hollow plug $v'$, interiorly screw-threaded for a portion of its length to receive the screw-threaded end of a stud $v^2$ in the form of a shouldered and headed screw. The latter projects into one of the circular recesses $w$ and carries an antifriction-roller $v^3$, which is recessed to accommodate the head of the stud or screw, so that the face of the latter comes flush with the outer end of the roller. The said stud or headed screw has a central passage $v^4$ communicating with the bore of the plug $v'$ and also communicating with a radial passage $v^5$, through which lubricating material can enter between the stud and the roller. An oil-hole $v^6$ in the boss $v$ communicates with the bore of the latter, and a flat spring $v^7$ or other suitable device is provided as a closure for said opening $v^6$. It will be understood that there are four of these studs and rollers on each side of the spoke-ring and they respectively occupy the several circular recesses $w$. The object of this arrangement is to provide for the maintenance of a positive driving connection between the hub and the spoke-ring at all times while permitting unobstructed radial play of the spoke-ring relative to the hub. It will be seen that the sides of the recesses are successively brought into engagement with the rollers on the studs when power is applied to the hub to rotate the same and weight is superimposed upon the hub. The effect is the same under rotation of the hub in either direction and the form of connection above described is found to admirably fulfil the requirements. Bushings $u$ are inserted into the circular recesses $w$, so as to form removable bearing-surfaces for the rollers, and I also provide for excluding dirt and dust from the said recesses by forming the spoke-ring with semicircular flanges or ears $t$ of sufficient extent to cover the portions of the circular recesses which project radially beyond the spoke-ring.

It will now be seen that the construction and arrangement of parts above described are well calculated to effectively accomplish the objects primarily set forth.

Having thus described my invention, what I claim as new, and desire to secure by Letters Patent of the United States, is—

1. In a vehicle-wheel, the combination of a hub or sleeve with encircling channels or grooves in its central portion and intervening bearing-surfaces; an annular series of antifriction-rollers on said bearing-surfaces; a cushion surrounding said series of rollers; and a spoke-ring embracing the cushion.

2. In a vehicle-wheel, the combination of a hub having side flanges; a spoke-ring between the same; ring washers between said spoke-ring and side flanges and grooved to contain lubricating material; and a cushion interposed between the spoke-ring and the hub.

3. In a vehicle-wheel, the combination of a hub having side flanges; ring washers bearing against the inner surfaces of the same; a cushion surrounding the hub; a spoke-ring embracing said cushion and extending over the peripheries of the ring washers; and spokes entered through the portion of the spoke-ring extending over the peripheries of the ring washers, substantially as and for the purpose described.

4. In a vehicle-wheel, the combination of a hub; sheet-metal disks fastened to the same and pressed out at different points forming a corresponding series of circular recesses in each disk; a spoke-ring between said flanges and having roller-equipped studs projecting from its sides and occupying said recesses, and a cushion interposed between the spoke-ring and the hub.

5. In a vehicle-wheel, the combination of a hub; sheet-metal disks fastened to the same and pressed out at different points forming a corresponding series of circular recesses in each disk; bushings in said recesses; a spoke-ring between said flanges and having roller-equipped studs projecting from its sides and occupying said recesses; and a cushion interposed between the spoke-ring and the hub.

6. In a vehicle-wheel, the combination of a hub; sheet-metal disks fastened to the same and pressed out at different points forming a corresponding series of circular recesses in each disk; a spoke-ring between said flanges and having roller-equipped studs projecting from its sides and occupying said recesses, and ears extending over and constituting covers for portions of the recesses; and a cushion interposed between the spoke-ring and the hub.

7. In a vehicle-wheel, the combination of a hub having recessed side flanges; a spoke-ring between said flanges and having roller-equipped studs projecting from its sides into the recesses of the latter, and having ears extending over portions of the recesses to constitute covers therefor; and a cushion interposed between the said spoke-ring and the hub.

8. In a vehicle-wheel, the combination of a hub having recessed side flanges; a spoke-ring having roller-equipped studs projecting from its sides and occupying said recesses, said spoke-ring and studs being provided with lubricating-channels; and a cushion interposed between the spoke-ring and the hub.

9. In a vehicle-wheel, the combination of a hub having recessed side flanges; a spoke-ring between said flanges and having bosses with screw-threaded bores; hollow plugs engaging said bores; studs or screws engaging the plugs and centrally channeled and also formed with radial passages leading out of the channels; rollers on the studs, and a cushion interposed between the spoke-ring and hub.

In testimony whereof I affix my signature in presence of two witnesses.

HARRY RAYMOND COLLINS.

Witnesses:
CHARLES E. RIORDON,
S. CLAUDIA EDMONSTON.